United States Patent [19]

Dezonno

[11] Patent Number: 5,737,405
[45] Date of Patent: Apr. 7, 1998

[54] APPARATUS AND METHOD FOR DETECTING CONVERSATION INTERRUPTIONS IN A TELEPHONIC SWITCH

[75] Inventor: Anthony J. Dezonno, Downers Grove, Ill.

[73] Assignee: Rockwell International Corporation, Downers Grove, Ill.

[21] Appl. No.: 506,502

[22] Filed: Jul. 25, 1995

[51] Int. Cl.$^6$ .................................................. H04M 3/22
[52] U.S. Cl. ...................... 379/265; 379/189; 379/192; 379/218; 379/309
[58] Field of Search .......................... 379/34, 35, 80, 379/158, 202, 203, 204, 205, 206, 208, 265, 309, 201, 377, 192, 218, 189

[56] References Cited

U.S. PATENT DOCUMENTS

| | | | |
|---|---|---|---|
| 4,303,804 | 12/1981 | Johnson et al. | 379/204 |
| 4,317,007 | 2/1982 | Harrison | 379/204 |
| 4,317,960 | 3/1982 | Johnson et al. | 379/204 |
| 4,456,792 | 6/1984 | Courtney-Pratt | 379/202 |
| 4,475,190 | 10/1984 | Marouf et al. | 379/202 |
| 4,479,211 | 10/1984 | Bass et al. | 379/202 |
| 4,648,108 | 3/1987 | Ellis et al. | 379/202 |
| 4,796,293 | 1/1989 | Blinken et al. | 379/202 |
| 5,317,567 | 5/1994 | Champion | 379/202 |
| 5,495,522 | 2/1996 | Allen et al. | 379/202 |

*Primary Examiner*—Krista Zele
*Assistant Examiner*—Scott Wolinsky
*Attorney, Agent, or Firm*—Welsh & Katz, Ltd.

[57] ABSTRACT

An apparatus 200 and method for detecting when an interruption occurs between an agent associated with a telephonic switch, such as an automatic call distributor 100, and a caller during an incoming telephone call. The automatic call distributor 100 routes incoming telephone calls generated by callers at external telephonic units 102 to agents located at agent telephonic units 106. Additional information concerning incoming telephone calls is displayed to the agents on agent terminals 118. The apparatus 200 includes a detection circuit 210 for detecting when an agent and a caller are concomitantly talking during an incoming telephone call. A caller audio signal detector 216 detects caller audio signals representative of the speech of a caller on a first bus 204 in the automatic call distributor 100. Similarly, an agent audio signal detector 222 detects agent audio signals representative of the speech of an agent on a second bus 208 in the automatic call distributor 100. When speech is simultaneously detected on both the first and second busses 204 and 208, an interruption has occurred. Detected interruptions may be reported to a supervisor via supervisor terminal 108 and/or to the agent via agent terminal 118.

20 Claims, 4 Drawing Sheets

FIG. 4

400 AGENT CUMULATIVE RECORDS

| AGENT ID (402) | TOTAL AVG. CALL (404) | AVE. AGENT TALK TIME (406) | AVE. INTER. PER CALL (408) |
|---|---|---|---|
| 123 | 3:15 | 1:53 | 2.0 |
| 124 | 4:53 | 2:10 | 5.1 |

FIG. 5

500 AGENT PER CALL RECORDS

| AGENT ID | TOTAL CALL TIME (502) | AGENT TALK TIME (504) | INTERRUPTS (506) |
|---|---|---|---|
| 123 | 4:50 | 2:43 | 2 |
| 123 | 3:30 | 2:17 | 4 |
| 123 | 1:25 | 0:39 | 0 |

APPARATUS AND METHOD FOR DETECTING CONVERSATION INTERRUPTIONS IN A TELEPHONIC SWITCH

BACKGROUND OF THE INVENTION

The present invention is related generally to devices for reporting data relative to the operation of a telephonic switch, such as an automatic call distributor, which routes an incoming telephone call from a caller to a selected agent and, more particularly, to an apparatus and method for detecting when an interruption occurs in the conversation between an agent and a caller during an incoming telephone call and for reporting such an interruption to the agent and/or to a supervisor of the agent.

Automatic call distribution (ACD) systems are increasingly being used by businesses to automatically route incoming customer calls to available agents. ACD systems generally include a multiport switch controlled by a central processing unit to interconnect external telephonic units of an external telephonic network with internal telephonic units. An example of such an ACD system is disclosed in U.S. Pat. No. 5,140,611 issued to Jones et al. on Aug. 18, 1992, entitled "Pulse Width Modulated Self-Clocking and Self-Synchronizing Data Transmission and Method for a Telephonic Communication Network Switching System", the disclosure of which is hereby incorporated by reference.

ACD systems provide for acquiring, processing and reporting information concerning different aspects of activity within the system. Typically, this information is presented in printed reports and/or displayed on a data display terminal. Based on this information, management and supervisory personnel are able to evaluate the processing of calls within the automatic call distributor and, if necessary, make changes for more efficient ACD system operation.

Unfortunately, very little information relating to the actual conversation between an agent and a caller is reported by the prior ACD systems. Supervisors typically must listen into an incoming telephone call to monitor an agent's telephone manners and the like. Until a complaint is received by a caller about a particular agent, the supervisor may spend a significant amount of time monitoring agents who are quite proficient at handling callers. Such a review process may result in the supervisor unnecessarily wasting time listening to the proficient agents.

Of course, a particular agent may be monitored after receiving a complaint from a caller. However, this is very inefficient since some, and possibly most, callers will not call to complain about an agent. They will simply be irritated and, in the worst case, never again call the company. This is obviously unacceptable to companies which depend upon telephone customers, such as a telemarketing firm.

One area of concern to supervisors is the agents' manners to the callers. Interrupting a caller is in many instances considered socially rude. For example, callers to a product complaint telephone number wish to have their problem heard to completion. These callers are in an agitated state and may react adversely to agents interrupting them. Unfortunately, agents may not even be aware of their propensity to interrupt callers.

Accordingly, there is a need in the art for an apparatus and method for detecting when interruptions occur during a conversation between an agent and a caller and for reporting interruptions to the agent or a supervisor. This information may be provided to the supervisor or agent in real-time or stored for later retrieval.

SUMMARY OF THE INVENTION

This need is met by an apparatus and method in accordance with the present invention for detecting when an agent interrupts a caller during an incoming telephone call in a telephonic switch. The apparatus monitors the busses over which the speech of the agent and the caller are transmitted and determines when they are concomitantly talking.

In accordance with one aspect of the present invention, an apparatus for detecting when an interruption occurs between a caller and an agent during an incoming telephone call in a telephonic switch, such as an automatic call distributor, is provided. A detection circuit detects an interruption when the agent and the caller are concomitantly talking during the incoming telephone call. Preferably, a reporting mechanism reports the interruption in response to the detection circuit. The reporting mechanism may immediately report the interruption to a supervisor and/or the agent via digital displays or store the interruption for later access. The detection circuit may comprise caller audio means for detecting when the caller is talking during the incoming telephone call; and agent audio means for detecting when the agent is talking during the incoming telephone call.

Generally, speech from the caller to the agent is transmitted over a first bus in the automatic call distributor as caller audio signals. The speech from the agent to the caller is transmitted over a second bus in the automatic call distributor as agent audio signals. The caller audio means may comprise, in such a configuration, a caller audio signal detector for detecting audio power of the caller audio signals. Caller threshold means establishes a caller threshold audio signal power which is compared to the detected audio power of the caller audio signals by caller comparison means. Based on this comparison it is determined whether the caller is talking.

The agent audio means may comprise an agent audio signal detector for detecting audio power of the agent audio signals. Agent threshold means establishes an agent threshold audio signal power. Agent comparison means compares the agent threshold audio signal power and the detected audio power of the agent audio signals and, based on this comparison, determines whether the agent is talking.

To provide further information regarding agent performance, a call time detector may be provided which detects a length of time of the incoming telephone call. The call time detector then presents the length of time of each incoming telephone call to the reporting mechanism for reporting to a supervisor and/or agent.

In accordance with another aspect of the present invention, a method is provided for detecting when an interruption occurs between a caller and an agent during an incoming telephone call. The method comprises the step of detecting when the agent and the caller are simultaneously talking during the incoming telephone call. The step of detecting may, preferably, comprise the steps of: detecting when the caller is talking during the incoming telephone call; and subsequently detecting when the agent begins talking concomitant with the caller talking.

It is thus a feature of the present invention to provide an apparatus and method for detecting when an interruption occurs between a caller and an agent and for reporting such an interruption to the appropriate personnel.

These and other features and advantages of the present invention will become apparent from the following detailed description, the accompanying drawings and the appended claims.

BRIEF DESCRIPTION OF THE DRAWINGS

FIG. 4 is an exemplary report showing agent cumulative records which may be generated by the present invention; and FIG. 5 is an exemplary report showing agent per call records which may be generated by the present invention.

DETAILED DESCRIPTION OF THE INVENTION

Figure 1:
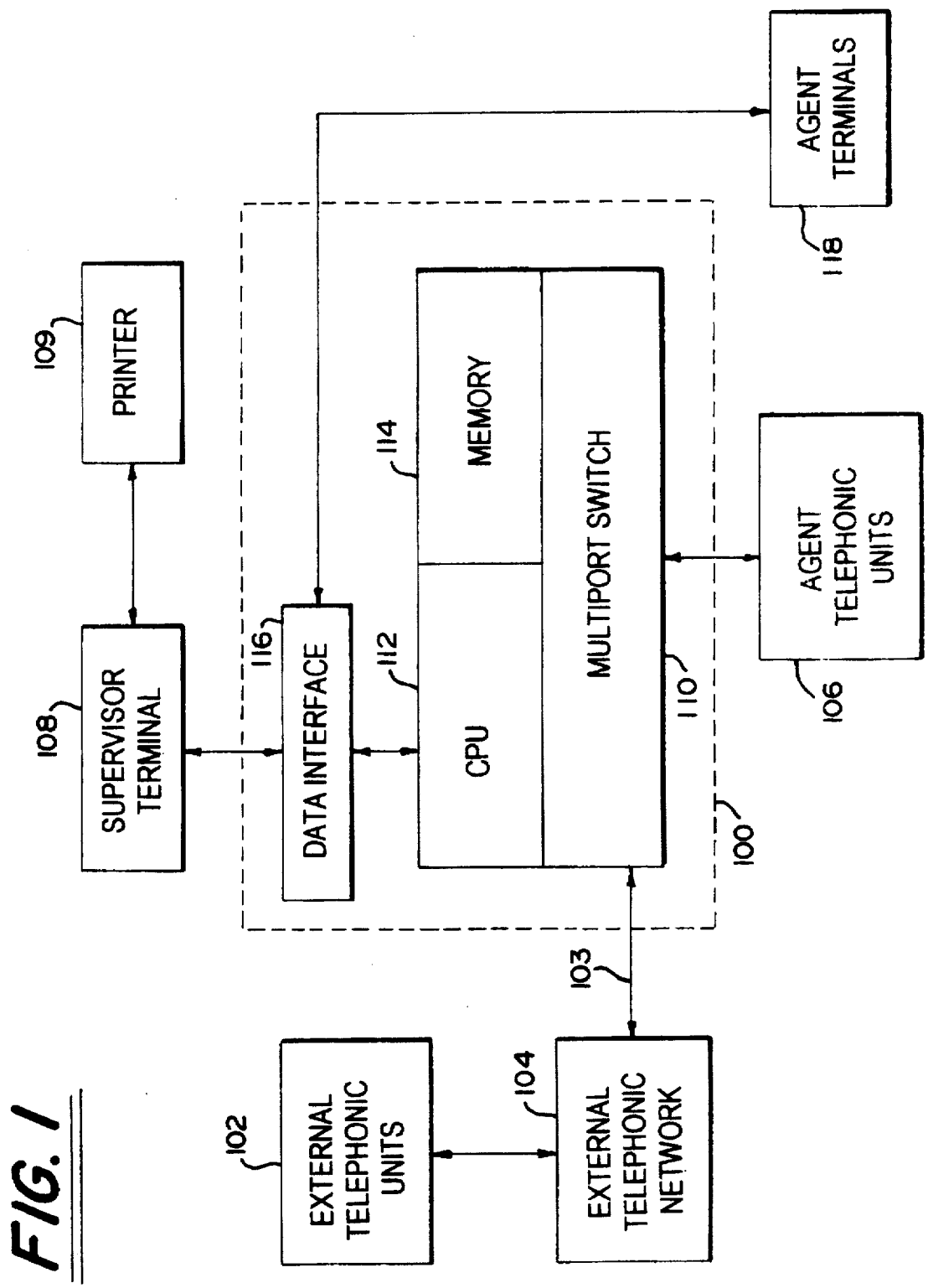
FIG. 1 is a schematic block diagram showing an automatic call distributor for routing incoming telephone calls from external telephonic units and to agent telephonic units.

A telephonic switch, such as automatic call distributor (ACD) 100, is shown in FIG. 1 in which an apparatus and method in accordance with the present invention for detecting when an interruption occurs between a caller and an agent during an incoming telephone call may be advantageously implemented. The ACD 100 routes incoming telephone calls received from external telephonic units 102 via a telephonic line 103 and an external telephonic network 104 to a plurality of agent telephonic units 106. As will be readily apparent to those skilled in the art, the telephonic switch, shown as ACD 100, may be any of a number of different call switching systems, or devices.

The ACD 100 is connected to a supervisor computer terminal 108, which preferably includes a data display unit for displaying information relating to the operation of the ACD 100. The supervisor computer terminal 108 is preferably connected to a printer 109 for generating printed records of information relating to the operation of the ACD 100, such as number of interruptions. The ACD 100 has a multiport switch 110 for routing incoming telephone calls to selected ones of the agent telephonic units 106. The multiport switch 110 is controlled by a central processing unit (CPU) 112, or other suitable computer circuit, having a memory 114. The CPU 112 is appropriately programmed to route incoming telephone calls through the ACD 100. Preferably, the processing power of the CPU 112 is provided by a 32 bit Motorola 68030 microprocessor.

Agent terminals 118, which may include conventional display units, display information relating to the operation of the ACD 100 to the agents receiving the incoming telephone calls. A data interface 116 provides communications between the CPU 112, the supervisor computer terminal 108 and the agent terminals 118. As will be readily apparent, the structure and philosophy of the above components of the ACD 100 are well known in the art and will not be further discussed herein. Further, other configurations of the ACD 100 can be advantageously employed in the present invention. For example, the agent terminals 118 may be an integral part of the agent telephonic units 106, such as digital displays on a telephone or telephonic console. In this case, the data and the voice signals would be transmitted over a single line to the telephonic consoles.

Figure 2:
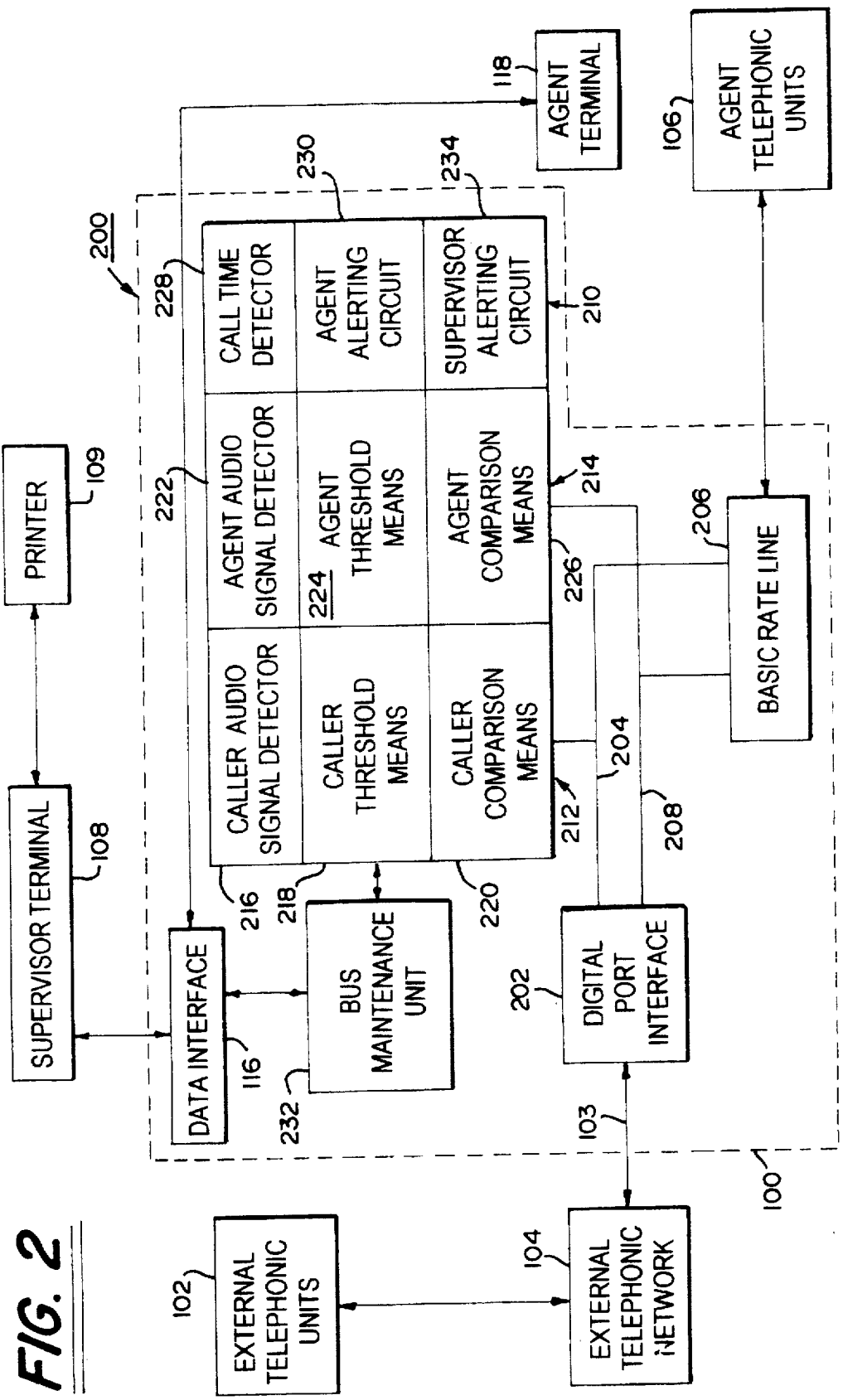
FIG. 2 is a schematic block diagram a detector circuit and reporting circuit in accordance with the present invention included in the automatic call distributor shown in FIG. 1.

A schematic diagram of an apparatus 200 for detecting when an interruption occurs between a caller and an agent, and more particularly when the agent interrupts the caller, within the ACD 100 in accordance with the present invention is shown in FIG. 2. A digital port interface 202 interfaces the ACD 100 with the external telephonic network 104. A first bus 204 transmits caller audio signals, representative of the caller's voice) from the digital port interface 202 to a basic rate line interface 206 for transmission to the agent telephonic unit 106. For clarity and ease of description only one agent telephonic unit 106 is shown in FIG. 2. However, it should be understood that the ACD 100 is preferably connected to a plurality of agent telephonic units 106 and one of the units 106 is selected to receive any one incoming telephone call. A second bus 208 transmits agent audio signals, representative of the agent's voice, from the basic rate line interface 206 to the digital port interface 202 for transmission to the external telephonic units 102 to establish voice communications between the agent and the caller.

A digital signal processor 210 analyzes the caller and agent audio signals on the respective first and second busses 204 and 208. The digital signal processor 210 preferably comprises one or more data analyzing circuits which are programmable. The structure and philosophy of a preferred digital signal processor is disclosed in commonly assigned U.S. Pat. No. 5,434,981, entitled "Functionally Programmable PCM Data Analyzer and Transmitter for Use in Telecommunication Equipment" to Lenihan et al., and having an issue date of Jul. 18, 1995, the disclosure of which is hereby incorporated by reference.

For purposes of the present invention, the digital signal processor 210 comprises a detection circuit for detecting an interruption when the agent and the caller are concomitantly talking during the incoming telephone call. The detection circuit comprises caller audio means 212 for detecting when the caller is talking during the incoming telephone call and agent audio means 214 for detecting when the agent is talking during the incoming telephone call. The caller audio means 212 includes a caller audio signal detector 216, caller threshold means 218 and caller comparison means 220. The caller audio signal detector 216 detects audio power of the caller audio signals being transmitted over the first bus 204 to the agent telephonic unit 106.

A caller threshold audio signal power is set by the caller threshold means 218. The caller comparison means 220 compares the caller threshold audio signal power to the detected audio power of the caller audio signals and determines whether the caller is talking based on the comparison. For example, when the detected audio power equals or exceeds the caller threshold audio signal power, the caller is determined to be talking during the incoming telephone call.

The agent audio means 214 comprises an agent audio signal detector 222, agent threshold means 224 and agent comparison means 226. The agent audio signal detector 222 detects audio power of agent audio signals being transmitted over the second bus 204 to the external telephonic network 104. Agent threshold means 224 establishes an agent threshold audio signal power. The agent comparison means 226 compares the agent threshold audio signal power to the detected audio power of the agent audio signals and determines whether the agent is talking based on the comparison. When the detected audio power equals or exceeds the agent threshold audio signal power, for example, the agent is determined to be talking during the incoming telephone call. Based on the detection of when the caller and agent are talking, the detection circuit determines when the agent and caller are concomitantly talking during the incoming telephone call.

To more particularly detect when the agent interrupts the caller, the present invention initially detects when the caller is talking. Any interruption which occurs while the caller is talking must be an interruption by the agent of the caller. If the agent is talking, any subsequent interruption must be made by the caller. Thus, the present invention may detect and report interruptions made by the agent, interruptions made by the caller or any interruptions.

A call time detector 228 detects a total length of time of the incoming telephone call for reporting purposes. Typically, a call timer is started when the telephone conversation begins and is stopped at the completion of the telephone conversation. Further, timers may be employed to determine the amount of time the caller and the agent talk during each incoming telephone call. These timers would be responsive to the caller audio means 212 and the agent audio means 214. Many methods are well known in the an for detecting the length of the complete telephone call and will not be further described herein.

The information obtained by the detection circuit and the call time detector 228 are reported to an agent and/or a supervisor by a reporting mechanism. The reporting mechanism comprises an agent alerting circuit 230 which receives information from the detection circuit when an interruption occurs between the caller and the agent and which transmits this information via a bus maintenance unit 232 and the data interface 116 to the agent terminal 118 to alert the agent. Similarly, a supervisor alerting circuit 234 receives information from the detection circuit indicating that the agent has interrupted the caller and transmits this information via the bus maintenance unit 232 and the data interface 116 to the supervisor terminal 108. The bus maintenance unit 232 provides the main computing power of the ACD 100 and may consist of various combinations of computer logic devices and circuits. As those skilled in the art will readily realize, the CPU 112 and the memory 114 are comprised, in part, of the bus maintenance unit 232 and the detection circuit. Further, the digital port interface 202 and the basic rate line interface 206 are part of the multiport switch 110.

The bus maintenance unit 232 may store the information and later transmit it to the supervisor terminal 108 and/or the agent terminal 118. Alternatively, the bus maintenance unit 232 may immediately transmit the information to the respective terminals 108 and 118. The information may then be stored in the terminals 108 and 118 and/or immediately presented to the supervisor or agent. Those skilled in the art will readily realize that the information obtained above may be reported in any of a number of manners.

Exemplary call reports, such as may be obtained from the reporting mechanism of the present invention, are shown in FIGS. 4 and 5. An illustrative report 400 of agent cumulative records is shown in FIG. 4. The report 400 includes an agent ID column 402 listing agent ID numbers which uniquely identify each of the agents of the ACD 100. For our example, two agents 123 and 124 are listed in the agent ID column 402. Total average call time is listed in column 404. Column 406 contains the average agent talk time and column 408 lists the average interruptions per call. An exemplary report 500 showing agent per call records for agent 123 is shown in FIG. 5. The total length of each call is listed in column 502, the amount of time the agent 123 talked during each call is listed in column 504 and the number of interruptions, or agent interruptions, for each call is listed in column 506.

Figure 3:
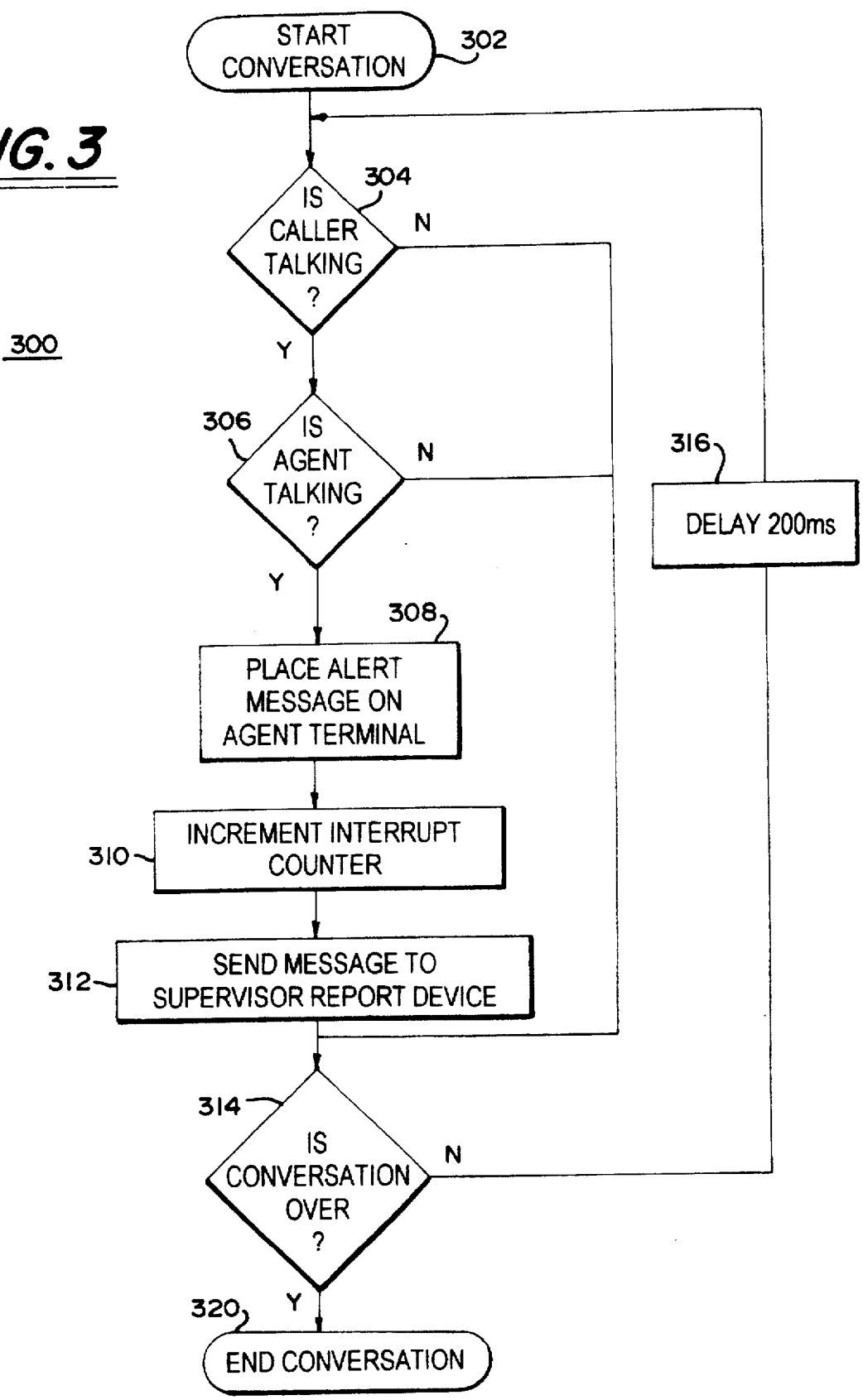
FIG. 3 is a flowchart illustrating the steps of a method for detecting when an agent interrupts a caller in accordance with the present invention.

A flowchart 300 comprising the steps in the operation of the present invention is shown in FIG. 3. The telephone conversation is started at step 302. It is initially determined whether the caller is talking at step 304. If the caller is talking, the invention, at step 306, determines whether the agent is talking. If so, then both agent and caller are concomitantly talking and an interruption has occurred. In response to the detection of an interruption, an alert message is placed on the agent terminal at step 308, an interrupt counter is incremented at step 310 and, at step 312, a message is sent to a supervisor report device, such as supervisor terminal 108.

If in steps 304 and 306 it is determined that either the caller or agent is not talking, no interruption has occurred and step 314 is then performed. At step 314, it is determined whether the conversation has ended. There are many well known methods in the art for detecting call disconnect. For example, the bus maintenance unit 232 may transmit a call disconnect signal to the detection circuit. The bus maintenance unit 232 determines that the call has been disconnected by receipt of a call disconnect message from the agent telephonic unit 106 on the basic rate line interface 206 or by receipt of a call disconnect signal from the digital port interface 202. Generating of call disconnect signals representative of disconnection of an incoming telephone call is well known in the art. Since the structure and philosophy of the method for detecting the end of the call is not important to the present invention beyond indicating to the detection circuit that the call has been disconnected, it will not be further discussed herein. If the conversation has not ended, a delay of 200 milliseconds occurs at step 316 and the flowchart 300 returns to step 304. If it is determined that the conversation has ended, the flowchart 300 is finished at step 320. As those skilled in the art will readily comprehend, a delay of 200 ms has been shown for exemplary purposes only and any delay time which would permit acceptable pauses in the telephone conversation without causing the detection circuit to sense an end of call may be employed.

In accordance with the present invention, .a method for detecting when an agent interrupts a caller during an incoming telephone call is provided. The method comprises the step of detecting when the agent and the caller are simultaneously talking during the incoming telephone call. Preferably, the step of detecting comprises the steps of detecting when the caller is talking during the incoming telephone call and subsequently detecting when the agent begins talking concomitant with the caller talking. An interruption is reported when the agent and caller are simultaneously talking during the incoming telephone call.

Having thus described the invention in detail by way of reference to preferred embodiments thereof, it will be apparent that other modifications and variations are possible without departing from the scope of the invention defined in the appended claims. For example, the flowchart 300 may have design configurations which depart from those described herein with reference to the FIG. 3.

What is claimed is:

1. In a telephonic swatch, an apparatus for detecting an interruption in a conversation between two participants during an incoming telephone call, said two participants including an agent and a caller, said interruption being detected when one of said participants begins talking while the other of said participants is talking, the apparatus comprising:

a detection circuit for actuating an interruption when the agent and the caller are concomitantly talking; and a reporting mechanism for reporting the interruption in response to the detection circuit detecting when the agent and the caller are concomitantly talking.

2. The apparatus as recited in claim 1 wherein the reporting mechanism comprises an agent alerting circuit for alerting the agent when an interruption is detected.

3. The apparatus as recited in claim 1 wherein the reporting mechanism comprises a supervisor alerting circuit for alerting a supervisor associated with the telephonic switch when an interruption is detected.

4. The apparatus as recited in claim 1 wherein the detection circuit comprises:

caller audio means for detecting when the caller is talking during the incoming telephone call; and agent audio means for detecting when the agent is talking during the incoming telephone call.

5. The apparatus as recited in claim 4 wherein the telephonic switch comprises a bus for transmitting caller audio signals from the caller to the agent, and, wherein the caller audio means comprises:

a caller audio signal detector for detecting audio power of the caller audio signals;

caller threshold means for establishing a caller threshold audio signal power; and caller comparison means for comparing the caller threshold audio signal power and the detected audio power of the caller audio signals and for determining whether the caller is talking based on the comparison.

6. The apparatus as recited in claim 4 wherein the telephonic switch comprises a bus for transmitting agent audio signals from the agent to the caller, and, wherein the agent audio means comprises:

an agent audio signal detector for detecting audio power of the agent audio signals;

agent threshold means for establishing an agent threshold audio signal power; and agent comparison means for comparing the agent threshold audio signal power and the detected audio power of the agent audio signals and for determining whether the agent is talking based on the comparison.

7. The apparatus as recited in claim 1 comprising a call time detector for detecting a length of time of the incoming telephone call and for providing the length of time of the incoming telephone call to the reporting mechanism for reporting the length of time.

8. The apparatus as recited in claim 1 wherein the reporting mechanism is selected from the group consisting of an agent alerting circuit for alerting an agent when an interruption is detected and a supervisor alerting circuit for alerting a supervisor associated with the telephonic switch when an interruption is detected.

9. In a telephonic switch for connecting an incoming role phone call from a caller to an agent, a method for detecting an interruption when the agent interrupts the caller or the caller interrupts the agent during the incoming telephone call, the method comprising the steps of:

detecting an interruption when the agent and the caller are concomitantly talking during the incoming telephone call; and reporting the interruption in response to detecting when the agent and the caller are concomitantly talking.

10. The method as recited in claim 9 wherein the step of detecting comprises the steps detecting when the caller is talking during the incoming telephone call; and subsequently detecting when the agent begins talking concomitant with the caller talking.

11. The method as recited in claim 10 wherein the step of detecting when the caller is talking comprises the steps of:

establishing a caller threshold audio signal power;

detecting caller audio signal power on a first bus over which speech of the caller is transmitted to the agent in the telephonic switch;

comparing the caller threshold audio signal power and the caller audio signal power; and indicating that the caller is talking when the caller threshold audio signal power is less than the caller audio signal power.

12. The method as recited in claim 11 wherein the step of detecting when the agent begins talking comprises the steps of:

establishing an agent threshold audio signal power;

detecting agent audio signal power on a second bus over which speech of the agent is transmitted to the caller in the telephonic switch;

comparing the agent threshold audio signal power and the agent audio signal power; and indicating that the agent is talking when the agent threshold audio signal power does not exceed the agent audio signal power.

13. In a telephonic switch for connecting an incoming telephone call from a caller to an agent, a method for detecting when the agent interrupts the caller during the incoming telephone call, the method comprising the steps of:

detecting when the caller is talking during the incoming telephone call;

subsequently detecting when the agent begins talking concomitantly with the caller; and reporting an interruption when the agent interrupts the caller.

14. The method as recited in claim 13 wherein the step of reporting comprises the steps of:

detecting a length of time of the incoming telephone call; and reporting the length of time of the incoming telephone call.

15. The method as recited in claim 14 wherein the step of reporting comprises the step of signaling a supervisor terminal indicating that an agent interrupt has occurred.

16. The method as recited in claim 13 wherein the step of reporting comprises the steps of:

alerting the agent substantially instantaneously with detecting that the agent interrupted the caller.

17. The method as recited in claim 13 wherein the step of alerting the agent comprises the steps of:

signaling an agent terminal associated with the agent; and displaying an alert message to the agent on the agent terminal.

18. In an automatic call distributor, an apparatus for detecting an interruption in a conversation between two participants during an incoming telephone call, said two participants including an agent and a caller, said interruption being detected when one of said participants begins talking while the other of said participants is talking, the apparatus comprising:

caller audio signal detector for detecting audio power of a caller audio signal;

caller threshold means for establishing a caller threshold audio signal power;

caller comparison means for comparing the caller threshold audio signal power and the detected audio power of the caller audio signal for determining whether the caller is talking based on the comparison;

agent audio signal detector for detecting audio power of an agent audio signal;

agent threshold means for establishing an agent threshold audio signal power; and agent comparison means for comparing the agent threshold audio signal power and the detected audio power of the agent audio signal for determining whether the agent is talking based on the comparison.

19. The apparatus as recited in claim 18 comprising a reporting mechanism for reporting the interruption when the agent and the caller are simultaneously talking.

20. The apparatus as recited in claim 19 wherein the reporting mechanism comprises an agent alerting means for alerting the agent when an interruption is detected.

* * * * *